United States Patent [19]

Furrey

[11] 3,843,958

[45] Oct. 22, 1974

[54] HUE CORRECTION FOR A CHROMA CHANNEL

[75] Inventor: John H. Furrey, Schaumburg, Ill.

[73] Assignee: Warwick Electronics, Inc., Chicago, Ill.

[22] Filed: Mar. 26, 1973

[21] Appl. No.: 344,545

[52] U.S. Cl. .................................. 358/40, 358/27

[51] Int. Cl. .............................................. H04n 9/48

[58] Field of Search... 178/5.4 HE, 5.4 AC, 5.4 CK, 178/5.2 A, 5.4 R

[56] References Cited

UNITED STATES PATENTS 3,627,911 12/1971 Shiono et al. .......................... 178/5.4

*Primary Examiner*—Richard Morray
*Assistant Examiner*—R. John Godfrey
*Attorney, Agent, or Firm*—Wegner, Stellman, McCord, Wiles & Wood

[57] ABSTRACT

In the chroma channel of a color television receiver, three transistor amplifiers drive the three cathodes of a color CRT. The emitter electrodes of the transistors for red and blue amplifiers are connected through a pair of matrix or feedback resistors which act to enhance flesh tones. The emitter electrode of the green amplifier transistor is coupled through a switchable feedback path, formed by a resistance and diode, to the red-blue feedback resistors to enhance green tones.

8 Claims, 2 Drawing Figures

HUE CORRECTION FOR A CHROMA CHANNEL

BACKGROUND OF THE INVENTION

This invention relates to a hue correction system for a color television receiver, and more particularly to a hue correction system which emphasizes flesh tone and green hues.

Various hue modification circuits have been developed to eliminate the need for frequent adjustment of the tint or hue control of a color television receiver. Without special circuitry, readjustment of the hue control is necessary when changes occur in a received channel, the program scene, or the camera televising a particular scene. Hue or tint errors are most apparent to a viewer when the televised scene contains either normal flesh tones, or green tones. Distortion of green tones in a scene is very noticeable because of the large number of familiar objects which are green, such as grass, trees, plants, etc. With the exception of flesh-tones, distortion of green tones in a scene is generally more objectionable than distortion of other colors such as red and magenta.

In the American Standard NTSC color transmission system, color hues are defined by the phase of a chroma signal with respect to a burst signal arbitrarily designated as having a phase angle of 180° on a color vector diagram. In conventional color television receivers, a chroma channel includes two or three color demodulators which extract information along two or three demodulation axes which bear a predetermined angular relationship with respect to burst. The noted tint or hue errors occur when the predetermined relationship between chroma and burst changes due to a phase shift of some components of the received composite color television signal.

Many correction techniques have been developed to reduce variations in flesh tones and/or green tones. Wide angle domodulation is the technique by which the angles between the demodulation axes are opened from 90° to something in the vicinity of 135°, compressing the included angle in the vicinity of the flesh or orange hues. Since this correction technique tends to distort green tones, correction circuits have been developed which use a separate demodulator, or a color level detector, to develop a correction signal which is then subtracted from a different color signal. An example of such a circuit is disclosed in the copending patent application of Leroy W. Nero and Kenneth A Merriweather, Ser. No. 302,849, filed Nov. 1, 1972, entitled "Hue Correction System", and assigned to the same assignee as the present application Green correction has also been accomplished by limiting the effect of a flesh tone correction circuit to low saturation scene components, as by biasing a transistor to produce limiting in the presence of highly saturated green hues, or by matrixing the red and blue output and feeding back the resultant to the input of the chroma demodulators.

A reduction in green hue has been accomplished by actuating a switch which connects together the emitters of the red and blue stages of an active matrix circuit driven from the chroma demodulators. Such a circuit is shown in U.S. Pat. No. 3,662,097 to Rennick. A flesh tone correction circuit, without green correction, has also been provided by emitter coupling of the matrix and drive transistors in the red, green, and blue output stages of a chroma channel. U.S. Pat. No. 3,701,844 to Cochran shows a hue correction circuit of this latter type.

It would be desirable to provide a correction circuit to emphasize flesh tone as well as green tones, without changing the phase angles of the color vectors so that only the amplitude of the vectors are affected. Such a circuit desirably should be of simple and straightforward design, and require a minimum number of components in addition to the components otherwise required in the chroma channel. This would require a substantial simplification with respect to the circuits heretofore utilized to enhance flesh tone and green tone hues.

SUMMARY OF THE INVENTION

In accordance with the present invention, an improved hue correction system for enhancing flesh tones and green tones is provided. The circuit is extremely simple, requires only a few components, can be added to a conventional chroma channel with little modification.

The applicant provides a matrix or feedback network between the emitters of the red, green, and blue transistor output drivers for the three cathodes of a color CRT. The feedback path for the green emitter includes a diode or other switching device poled so as to selectively enable green enhancement for a limited range of the color vector diagram. The circuit affects only the amplitudes of the color vectors, and does not change the phase angles of the color vectors.

One object of the present invention is an improved chroma channel with a hue correction circuit for enhancing or modifying flesh tones and green tones, by use of a switchable feedback path.

Other objects and advantages of the present invention will be apparent from the following description, and from the drawings. While an illustrative embodiment of the invention is shown in the drawings and will be described in detail herein, the invention is susceptible of embodiment in many different forms and it should be understood that the present disclosure is to be considered as an exemplification of the principles of the invention and is not intended to limit the invention to the embodiment illustrated. Throughout the specification, values will be given for certain of the components in order to disclose a complete, operative embodiment of the invention. However, it should be understood that such values are merely representative and are not critical unless specifically so stated.

DESCRIPTION OF THE PREFERRED EMBODIMENT

Figure 1:
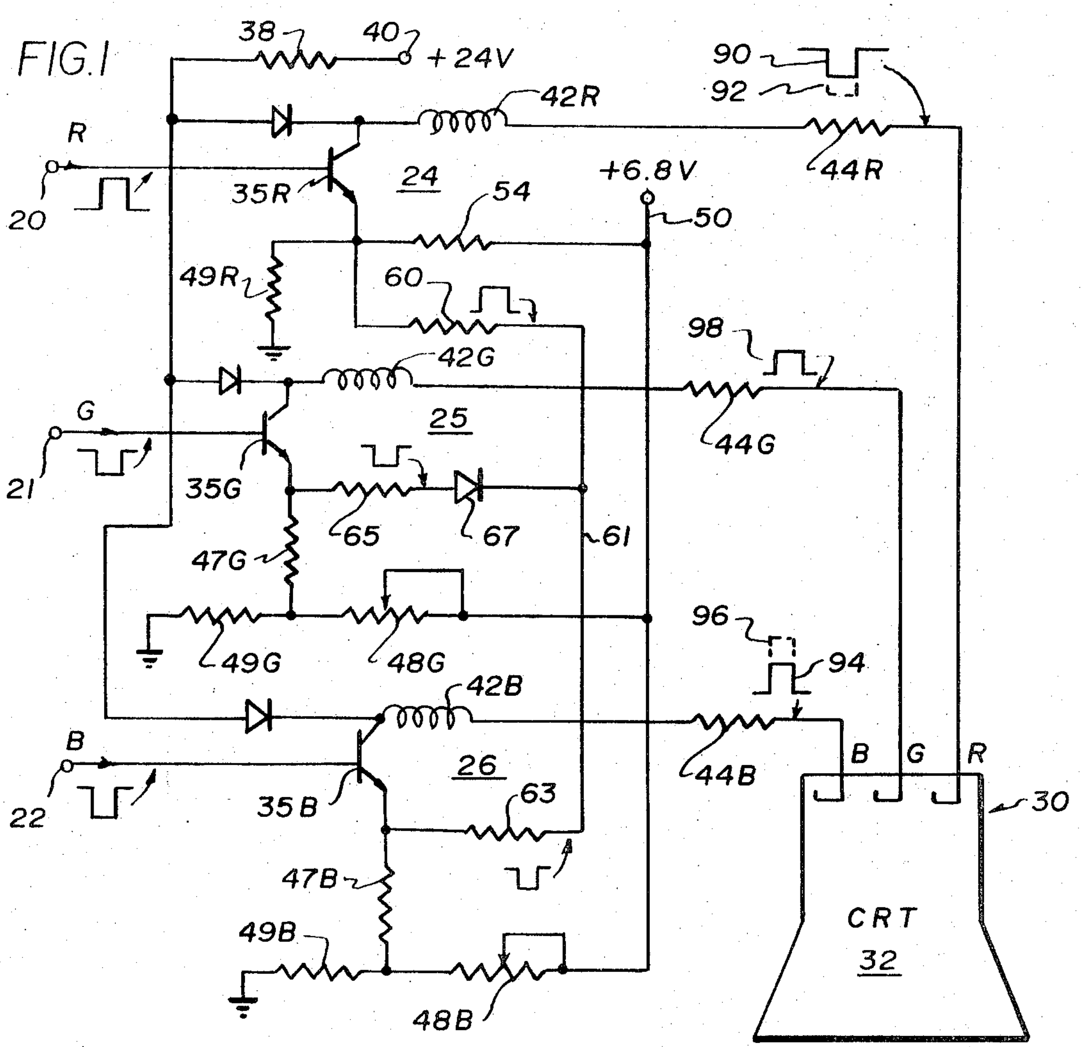
FIG. 1 is a schematic diagram of the output portion of a chroma channel of a color television receiver, incorporating a novel hue correction circuit.

Turning to FIG. 1, a chroma channel of an otherwise conventional color television receiver is illustrated. The chroma channel includes a demodulator and matrix circuit for matrixing a demodulated color component with luminance information in order to provide red (R), green (G), and blue (B) video output signals at terminals 20, 21, and 22, respectively. Three color output amplifier stages 24, 25, and 26 are respectively driven by the R, G, and B chroma output signals to develop amplified chroma output signals which are coupled to the respective R, G, and B cathodes of an image reproduction device such as a color cathode ray tube (CRT) 32.

For clarity, similar components in each color output amplifier 24, 25 and 26 have been identified with the same reference numeral, followed by an R, G or B to identify the particular color amplifier in which the component is located. Each color amplifier includes an NPN transistor 35 having a base electrode directly coupled to the input color terminal 20, 21 or 22, and a collector electrode coupled through a diode 37 and a common resistor 38 to a supply 40 of DC potential, such as +24 volts. Each collector electrode is also coupled through an inductor 42 and a resistor 44 to the corresponding CRT cathode 30.

The emitter electrodes of transistors 35G and 35B are coupled through a resistor 47 to the junction of a voltage divider formed by a variable resistor 48 in series with a fixed resistor 49, located between a common potential line 50 and a source 52 of ground reference potential. Potential line 50 may carry a DC voltage such as +6.8 volts. The emitter circuit of transistor 35R is similar, except that variable resistor 48 is replaced with a fixed resistor 54, and that resistor 47 has been omitted. The three color output amplifiers 24, 25, and 26, to the extent described above, are conventional and serve to drive the cathodes 30 with pure color signals R, G and B.

In accordance with the present invention, the emitter electrode of transistor 35R also is coupled through a feedback resistor 60, such as 560 ohms, to a common feedback line 61. The emitter electrode of transistor 35B also is coupled through a feedback resistor 63, such as 1.5 kilohoms, to the common feedback line 61. The emitter electrode of transistor 35G is coupled through a switchable feedback path, consisting of a gain control such as 68 ohms, resistor 65, in series with a switchable device, as a silicon semiconductor diode 67, to common feedback line 61.

Figure 2:
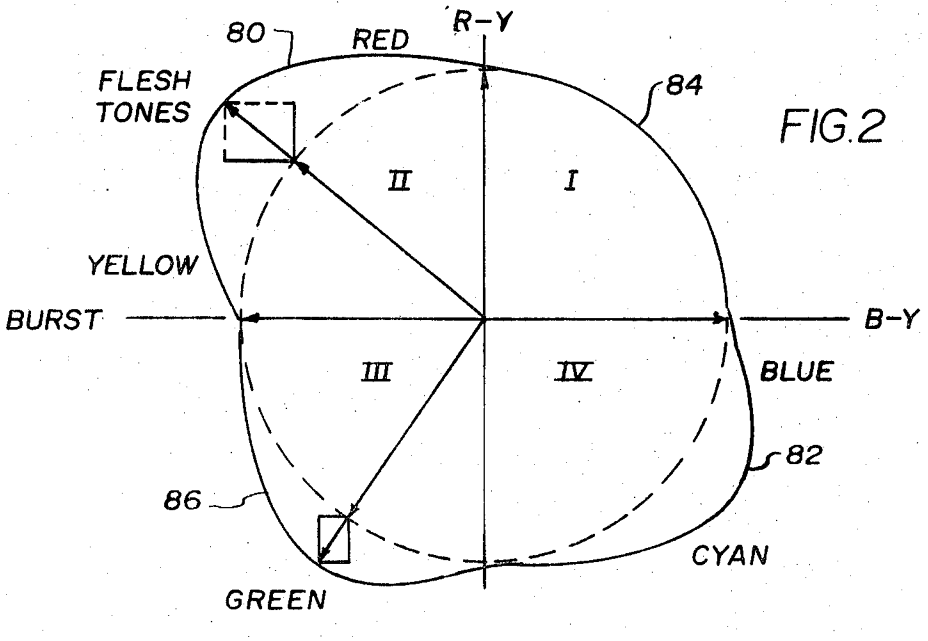
FIG. 2 is a color vector diagram illustrating in solid lines (not to scale) the amplitude and phase relationships produced by the circuit of FIG. 1, and illustrating in dashed lines the amplitude and phase relationships of an unmodified chroma channel.

The operation of the emitter feedback network can be understood with reference to the color vector diagram shown in FIG. 2. As is conventional, the axis coinciding with the B-Y signal is designated 0°, with reference burst being located at 180°. The flesh tone hues to be enhanced fall generally at the center of the second quadrant II of the color vector circle. The green tone hues which are to be enhanced fall slightly to one side of the center of the third quadrant III. The dashed lines located along a perfect circle represent the phase and amplitude (saturation) of the color vectors which would be reproduced by the CRT 32 in the absence of the emitter feedback network, assuming that no phase errors have occurred in color generation nor transmission.

Generally, the emitter feedback resistors 60 and 63 cause the vector diagram to bulge, as shown by solid lines 80 and 82 (not to scale) in the vicinity of the second, II, and fourth, IV quadrants. The phase correction is in the form of an amplitude or gain change, without a phase change. The modified curve formed by segments 80 and 82 is somewhat similar to the ellipse pattern produced by wide angle demodulation, except that the sides of the ellipse are not compressed as would result from wide angle modulation. In fact, the segment 84 in the first quadrant I is substantially unchanged from a pure circle.

The switchable feedback path including gain control resistor 65 and normally blocking diode 67 produces an altered response segment 86 (not to scale) in the third quadrant III. In the following chart, the polarity of the R, G, and B signals at terminals 20, 21 and 22 is indicated for a given hue which falls within the designated quadrant of the color circle:

| Quadrant | R | B | G |
|---|---|---|---|
| I | + | + | − |
| II(1) | + | − | − |
| II(2) | + | − | + |
| III | − | − | + |
| IV(1) | − | + | + |
| IV(2) | − | + | − |

The reference (1) refers to the first portion of a quadrant, whereas reference (2) refers to the last portion of a quadrant.

Assuming first that a received color signal has a flesh tone hue and falls in the first portion of the second quadrant II(1), the polarity of the input signals to transistors 35R, 35G, and 35B are illustrated in FIG. 1 by positive and negative going pulses. The positive input to the base of transistor 35 drives the emitter positive. The emitter of transistor 35B goes negative at this same time. Although the emitter of transistor 35G is also going negative, the diode 67 blocks any signal transfer to the feedback line 61.

The effect of the pulses passed by feedback resistors 60 and 63 is to increase in an absolute sense the collector output signals of transistors 35R and 35B. The collector output signals of transistors 35R in the absence of the feedback network, is shown as a pulse 90, which is opposite to the polarity of the input driving pulse at terminal 20. The effect of the feedback network is to extend pulse 90 by an additional distance 92, thus driving the R cathode 30 harder in the positive saturation sense. Similarly, an output pulse 94 from the collector of transistor 35B is increased by an additional amount 96 due to the presence of the feedback path. This causes the B cathode 30 to be driven further in the −B direction. An output pulse 98 from the cathode of transistor 35G is unaltered due to the blocking effect of diode 67.

In the first quadrant I, both the R and B signals are positive, hence the feedback resistors 60 and 63 do not aid each other as their correction signals cancel. That is, the effect of the pair of positive going signals through resistors 60 and 63 produces the same bias point on line 61. The G signal in quadrant I goes negative and reverse biases diode 67, thus preventing any change in gain in the other amplifiers. Therefore, the curve 84 for the first quadrant is substantially unaltered from a circle.

In the third quadrant III, the G signal at the base and emitter is positive, and both the R and B base and emitter signals are negative. Although the pair of negative signals through resistors 60 and 63 tend to produce the same bias voltage on feedback line 61, the switching diode 67 is now forward biased by the G emitter signal. The net effect of this predetermined combination of color signals is to increase in an absolute sense the negative going signal at the collector of transistor 35G, thereby driving the green cathode further into saturation. This causes the bulge 86 illustrated for the third quadrant III.

Although the G emitter signal is also positive during the last portion (2) of the second quadrant II, and the first position (1) of the fourth quadrant IV, the absolute value of the green signal is small. The semiconductor material of diode 67 is chosen, in conjunction with the voltages present at this time in the feedback network, so that the small positive G emitter signal is not sufficient to forward bias the diode. Therefore, the diode 67 remains nonconductive until a G signal of greater magnitude is present, as occurs in the third quadrant III. Therefore, shapes of the segments 80 and 82 are controlled by the R and B feedback resistors 60 and 63.

While the output stages 24, 25 and 26 have been illustrated as color amplifiers for pure color signals, it will be appreciated that the feedback network equally can be applied to color amplifiers for color difference signals. Also, the feedback network can be used with a signal translating stage which forms an active matrix circuit, as by combining a color difference signal on one electrode with a luminance signal on a different electrode. Other modifications and changes can be made within the scope of the invention.

Having described the invention, the embodiments of the invention in which an exclusive property or privilege is claimed are defined as follows:

1. In a color television receiver having an image reproduction device and a chroma channel which develops three color signals, the improvement comprising:
- three color stages corresponding to a red output stage, a green output stage, and a blue output stage for coupling the three color signals to the image reproduction device, switchable feedback means coupled to the green output stage for selectively altering the green output signal therefrom, including
- gain control means for altering the gain of said green output stage, and
- a switchable device responsive to a predetermined combination of color signals which indicate a green hue is to be reproduced for enabling the gain control means.

2. The improvement of claim 1 including further feedback means coupled to the red and blue output stages for altering the red and blue output signals in response to color signals occurring in the second and fourth quadrants of a color vector diagram.

3. In a color television receiver having an image reproduction device and a chroma channel which develops three color signals, the improvement comprising:
- three color stages each including an active semiconductor device having first and second electrodes and a control electrode, means respectively coupling the control electrodes to the three color signals, means coupling the first electrodes to the image reproduction device,
- switchable feedback means coupled to the second electrode of one of the three color stages for selectively altering a color output signal therefrom, including
- gain control means for altering the gain of said one color stage, and
- a switchable device responsive to a predetermined combination of color signals for enabling the gain control means.

4. The improvement of claim 3 including further feedback means coupled between the second electrodes of the remaining color stages for altering the output thereof.

5. The improvement of claim 4 wherein said active device comprises transistors having collector and emitter electrodes corresponding respectively to said first and second electrodes and a base electrode corresponding to said control electrode, said switchable feedback means comprises resistive means corresponding to said gain control means and diode means corresponding to said switchable device, said resistive means and diode means being in series between the emitter electrode of said one output stage and further resistive means coupled to the emitter electrodes of the remaining stages, said further resistive means corresponding to said further feedback means.

6. In a color television receiver having an image reproduction device and a chroma channel which develops three color signals, the improvement comprising:
- three color stages each including a transistor having first, second and base electrodes, means individually coupling the base electrodes to the three color signals, means individually coupling the first electrodes to the image reproduction device, a common feedback line,
- switchable feedback means located between the second electrode of said one output stage and the common feedback line for selectively altering a color output signal therefrom, including
- gain control means for altering the gain of said one color stage,
- a switchable device responsive to a predetermined combination of color signals for enabling the gain control means, and
- impedance means for coupling the second electrodes of the remaining color output stages to the common feedback line.

7. The improvement of claim 6 wherein said switchable feedback means includes first resistive means corresponding to said switchable device, said first resistive means and said diode being in series between the second electrode of said one color output stage and said common feedback line.

8. The improvement of claim 7 wherein said impedance means comprises second and third resistive means coupled between the second electrodes of the remaining color output stages and said common feedback line.

* * * * *

PO-1050
(5/69)

UNITED STATES PATENT OFFICE
CERTIFICATE OF CORRECTION

Patent No. 3,843,958 Dated October 22, 1974

Inventor(s) John H. Furrey

It is certified that error appears in the above-identified patent and that said Letters Patent are hereby corrected as shown below:

Claim 7, line 3, after "said", first occurrence, insert: --gain control means and a diode corresponding to said--.

Signed and sealed this 14th day of January 1975.

(SEAL)
Attest:

McCOY M. GIBSON JR.
Attesting Officer

C. MARSHALL DANN
Commissioner of Patents